United States Patent
Scandurra et al.

(10) Patent No.: US 8,538,273 B2
(45) Date of Patent: *Sep. 17, 2013

(54) SYSTEM-ON-CHIP HAVING OPTICAL INTERCONNECTIONS

(75) Inventors: Alberto Scandurra, Messina (IT); Giovanni Strano, Giarre (IT); Carmelo Pistritto, Catania (IT)

(73) Assignee: STMicroelectronics s.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,280

(22) Filed: Jul. 26, 2012

(65) Prior Publication Data

US 2012/0301144 A1 Nov. 29, 2012

Related U.S. Application Data

(63) Continuation of application No. 12/757,200, filed on Apr. 9, 2010, now Pat. No. 8,260,147.

(30) Foreign Application Priority Data

Apr. 30, 2009 (IT) ............................... TO2009A0347

(51) Int. Cl.
*H04B 10/00* (2013.01)
*H04B 10/80* (2013.01)

(52) U.S. Cl.
CPC ................................... *H04B 10/801* (2013.01)
USPC .......................................... 398/164; 398/136

(58) Field of Classification Search
USPC .................... 398/45, 48–50, 135, 136, 164
See application file for complete search history.

(56) References Cited

U.S. PATENT DOCUMENTS

| 7,327,581 | B2 * | 2/2008 | Ohmori ........................ 361/760 |
| 7,490,189 | B2 | 2/2009 | Eberle et al. |
| 7,634,195 | B2 * | 12/2009 | Singh et al. .................... 398/79 |
| 7,804,504 | B1 | 9/2010 | Agarwal |
| 2003/0021515 | A1 | 1/2003 | Brophy |
| 2004/0126053 | A1 | 7/2004 | Ouchi |
| 2005/0058393 | A1 | 3/2005 | Solgaard et al. |
| 2007/0198755 | A1 * | 8/2007 | Honda ........................... 710/36 |
| 2009/0252498 | A1 | 10/2009 | Agranat |

OTHER PUBLICATIONS

M. Biere, et al., "Towards the High-Level Design of Optical Networks-on-Chip. Formalization of Opto-Electrical Interfaces", IEEE publication, 2007, pp. 427-430.

(Continued)

Primary Examiner — Dalzid Singh
(74) Attorney, Agent, or Firm — Hogan Lovells US LLP

(57) ABSTRACT

A system for exchanging information in an on-chip communication network using optical flow information for communication between Intellectual Property cores. The information is exchanged between a plurality of initiators and targets in the Intellectual Property cores. The system includes a router for propagating optical flow information from the initiators to the targets. Each initiator includes an interface to convert the traffic generated by the initiator and transmit it in the form of an optical flow within the on-chip communication network, and each target includes an interface to convert information from the optical form into the electrical form. The system is organized as a parametric system and includes programming module to define a first set of high level parameters, a second set of initiator network interface parameters and a third set of target network interface parameters.

42 Claims, 8 Drawing Sheets

(56) References Cited

OTHER PUBLICATIONS

E. Beigne, et al., "An Asynchronous Power Aware and Adaptive NoC Based Circuit", IEEE Journal of Solid State Circuits, vol. 44, No. 4, Apr. 2009, pp. 1167-1177.

B. Koch, Written Opinion, IT Patent Application No. TO20090347, Mar. 16, 2010, pp. 1-7.

Dr. ssa L. Guglielmetti, Office Action, Domanda n. TO2009A000347, Aug. 9, 2001, pp. 1.

L. Bosotti, Buzzi, Notaro & Antonielli d'Oulx, European Patent, Trademark and Design Attorneys, Office Action, Domanda n. TO2009A000347. Procedimento di esame, Dec. 12, 2011, pp. 1-3.

Wikipedia, the free encyclopedia, Semiconductor Intellectual Property Core, Wikipedia article, pp. 1.

L. Schwiebert et al., "The Impact of Output Selection Function Choice on the Performance of Adaptive Wormhole Routing", research paper, Detroit, MI, pp. 1-6.

Wikipedia, the free encyclopedia, FIFO, Wikipedia article, pp. 1.

* cited by examiner

SYSTEM-ON-CHIP HAVING OPTICAL INTERCONNECTIONS

RELATED APPLICATION

This application is a continuation of U.S. patent application Ser. No. 12/757,200 filed Apr. 9, 2010, which claims the benefit of Italian Patent Application No. TO2009A000347 filed Apr. 30, 2009, which is incorporated herein in its entirety by this reference.

FIELD OF THE INVENTION

The present invention relates to communication techniques particularly with respect to possible use in interconnection in the System-on-Chip (SoC) domain. More particularly, the description refers to On-Chip network architectures which exploit optical interconnections (Optical Network-on-Chip—ONoC) for interconnecting Intellectual Property (IP) cores.

DESCRIPTION OF THE RELATED ART

Currently, SoC communication systems are mainly based on Bus technologies or on modern technologies integrated on a chip (Network-on-Chip—NoC). In order to interconnect the various entities, bus architectures exploit various protocols such as for example the STMicroelectronics' STBus protocol, ARM's AMBA (Advanced Microcontroller Bus Architecture) protocol in the APB (Advanced Peripheral Bus), AHB (Advanced High-performance Bus) and AXI (Advanced extensible Interface) versions, IBM's CoreConnect protocol, and SONICSper's Silicon Backplane. In particular, the STBus protocol is an example of a high performance IP protocol, described in "STBus Communication System: Concepts and Definitions", November 2007, available at www-.st.com as of date of filing of this application.

Network-on-Chip network architectures are used for communication between various Intellectual Property (IP) cores within an SoC system. STMicroelectronics' STNoC and SONICS' Smart Connect architectures are representative examples.

From an architectural point of view, NoC networks overcome the limitations of platforms based on a Bus interconnection by providing each IP core interfaced to the network with one or more channels reconfigurable for a high speed communication.

The abovementioned "electrical" interconnection solutions however suffer from physical integration problems inside the chip.

FIG. 1 shows a plan schematic view of an example of a CMOS (Complementary Metal Oxide Semiconductor) chip for consumer electronics applications. Clearly observable are the interconnections obtained through the versatile STNoC (VSTNoC) solution. In particular, and with reference to FIG. 1, the CMOS electronic component is indicated in its entirety with reference number 1. Obtained on the component 1 is a plurality of IP cores indicated with reference 2. The interconnection structure of the various IP cores 2 includes, in the case illustrated herein, two NoC routers 3, a network interface 4 associated to each IP core 2 present on the chip 1, and electrical interconnections or routing paths 5 which connect each network interface 4 to one of the two routers 3. Furthermore, the two routers 3 are also connected to each other in order to ensure complete interconnectivity. In this solution, the IP cores 2 are thus interconnected to each other through routers 3 which implement the packet switching techniques.

Considering the dimensions and shape of the space on the chip available for the interconnections (i.e., the residual space between the various IP cores present on the chip), it is clear how difficult it is to position and direct the interconnections. In particular, the connection lines may trigger critical aspects due to the congestion and distances to be covered, which may require the use of repeaters to prevent signal degradation.

Furthermore, positioning many lines near each other causes greater capacitive coupling and hence a higher probability of interference (cross talk) and reduction of the operative frequency.

The main problems of this type of architecture derive from the physical level, particularly when DSM (Deep SubMicron) technology is used, because limitations arise regarding the performance that may be obtained by means of an electrical interconnection structure; such effects are linked to the delay imparted by the lines, to the migration of electric charges, noise, interference, traffic congestion and energy consumption.

An ONoC network is a network with optical interconnections obtained by means of an architecture integrated in an SoC system. In ONoC networks, optical signals are used as a carrier signal for transporting information, contrary to what occurs on traditional System-on-chip (SoC) communication systems, wherein the information is transported in form of electrical signals (current, voltage).

ONoC networks may use routing paradigms wherein the destination addresses are no longer contained in the packets that transport data, but are inherently contained in the wavelengths of the optical signs used.

Such approach is particularly advantageous for next generation SoC systems, bound to reach an even higher complexity and performance levels to a point that traditional on-chip interconnection solutions, i.e. the Bus and Network-on-Chip (NoC) networks, shall no longer be capable of meeting the performance standards, especially regarding the bandwidth.

The European Commission project called PICMOS (Photonic Interconnect Layer on Complementary Metal Oxide Semiconductor) proved the possibility of obtaining an entire optical connection on a nanophotonic waveguide platform. The manufacture of a silicon waveguide was implemented in the IMEC (Interuniversity MicroElectronics Center) research institute in Leuven (Belgium) while the die-to-wafer bonding process and the process of masking mesa transistors of group III-V were implemented at the LETI institute in Grenoble. The processes were implemented on a 200 millimeter substrate using a pilot CMOS line. The further processes of chemical etching and metallisation were carried out in cleanrooms to etch semiconductors belonging to group III-V of the table of elements, of the IMEC, INL and TU/E (Technische Universiteit Eindhoven) centers.

Two different integration strategies were studied for the integration of the optical connection in a CMOS structure.

A first strategy provides for the wafer-to-wafer bonding, in such a manner that the photonic interconnection layer is manufactured parallel to the wafer containing electronic circuits and in such a manner to be independent therefrom; subsequently, the photonic layer is connected to the wafer whereon the connection photonic circuits are located and the required electric connections are provided using technology at the wafer-scale-level; lastly, the wafer is divided and packaged using standard techniques.

A second strategy instead provides for an integrated circuit (IC) which consists in manufacturing the interconnection photonic level directly on-top (upper layer) of the electronic circuits.

CMOS integrated circuits are designed at physical level following the standard back-end flow; this means that, starting from the network nodes interconnection list (netlist) of the front-end to be designed, the following tasks are performed using suitable tools:

floorplanning,
positioning,
generating clock trees,
routing,
power distribution, and
physical checks (DRC—Design Rule Check, ERC—Electrical Rule Check, LVS—Layout versus Schematic).

SUMMARY OF THE INVENTION

Regarding the information outlined above, there arises the need of an alternative approach in terms of defining the physical level.

An object of the invention is to provide a system capable of overcoming interconnection drawbacks in on-chip communication systems.

According to the invention, such object is obtained due to a system having the characteristics referred to in the in the claims that follow.

The claims form an integral part of the technical disclosure provided herein in relation to the invention.

In an embodiment, optical interconnection of the IP cores provides a solution to the problems of the prior art which uses electrical interconnections.

In an embodiment, the physical level having an Optical Network-on-Chip implies support and modification of the upper levels of the ISO/OSI stack for example the connection level (data link) for detecting and correcting errors, the network level for the routing information, and the transport level for efficient and reliable support of the protocols for the end-to-end connections.

In an embodiment, introduction of a new physical level, like the one for optical interconnection, leads to defining an actual communication architecture, in such a manner to exploit the advantages given by the presence of the new physical level itself.

BRIEF DESCRIPTION OF THE DRAWINGS

Now, the invention shall be described, purely for exemplifying and non-limiting purposes, with reference to the attached representations, wherein.

DETAILED DESCRIPTION OF PREFERRED EMBODIMENTS

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader and thus they do not define the scope of protection or the range of the embodiments.

Figure 1:
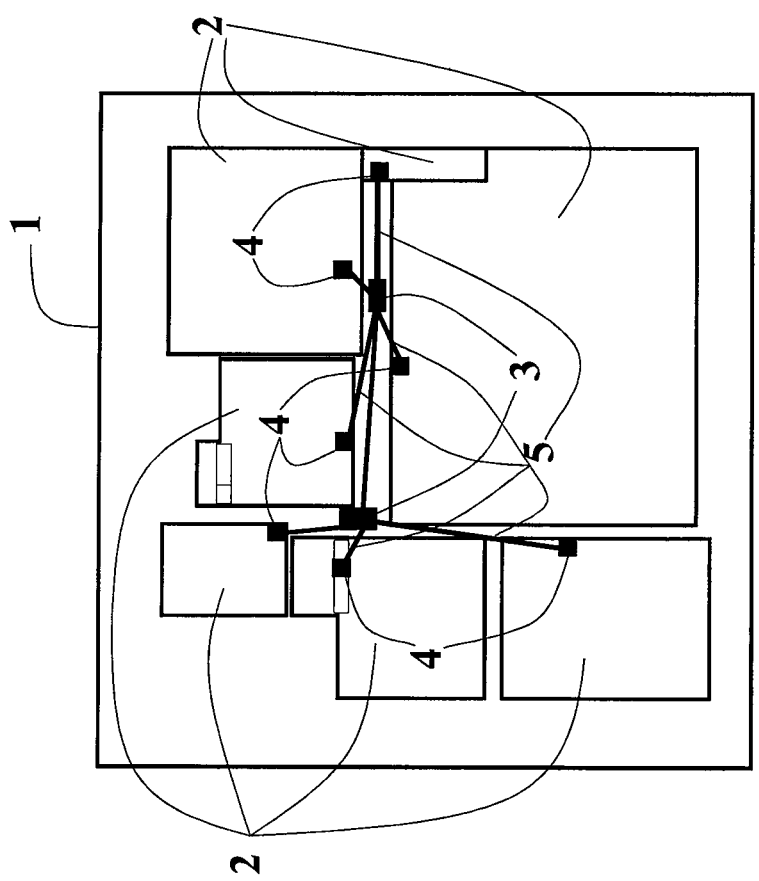
FIG. 1 shows a plan schematic view of an exemplary CMOS (Complementary Metal Oxide Semiconductor) chip for consumer electronics applications.

In the figures, parts, elements or components identical or equivalent to parts, elements or components already described with reference to FIG. 1 are indicated with the same references, making it unnecessary to repeat the corresponding description.

The solution described herein is based on an On-Chip network architecture which uses optical interconnections (Optical Network-on-Chip). It is based on the ISO/OSI protocol stack, and can be seen as very similar to the VSTNoC architecture, where the physical level is replaced with an entirely new level which uses optoelectronic laws, with the aim of transmitting information in the form of light.

The main elements that form a Network-on-Chip are the Network Interface (NI), routers or nodes, and the channel. The network interfaces NI provide the access point for the IP cores, the routers provide the actual mechanism for transporting data, and the channels are used to obtain point-to-point interconnections.

Figure 2:
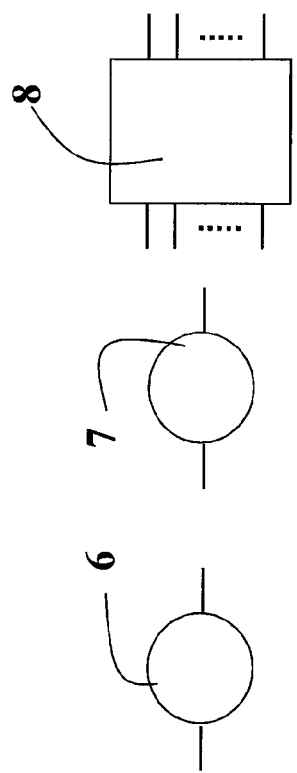
FIG. 2 shows some modules used for designing an ONoC architecture.

Referring to FIG. 2, certain modules used for designing the ONoC architecture are illustrated:

an interface of the initiator, Initiator Optical Network Interface (IONI), indicated with reference 6, responsible for converting the traffic generated by an initiator into a form suitable to be transmitted in optical form within the ONoC network; the IONI interface contains—therein—an optoelectronic transmitter which provides the actual conversion of the information from electrical form to optical form, by serializing information; furthermore, the transmitter selects the emitter according to the desired wavelength and controls the driving of the emitter; the IONI interface manages the responses coming from the network in a manner analogous to how the TONI target interface (see below) manages the requests;

a λ router (LAMBDA router) 8, responsible for the actual propagation of the optical flow information coming from the sources to the destinations;

a target interface, Target Optical Network Interface (TONI) 7, responsible for the conversion of information from optical form into electrical form; the TONI interface contains—therein—an optoelectronic receiver which performs the actual conversion of information from its optical form to the electric form suitable to be received by the target through detection and conversion between the received photocurrent and the voltage, adjustment of the level and deserialisation of the information; TONI interface generates responses from the transmitter towards the network in a manner analogous to how the interface of the IONI initiator manages the requests.

IONI and TONI interfaces are modules belonging to the electric domain, while the receiver, transmitter and λ router (LAMBDA router) are modules belonging to the optical domain.

Figure 3:
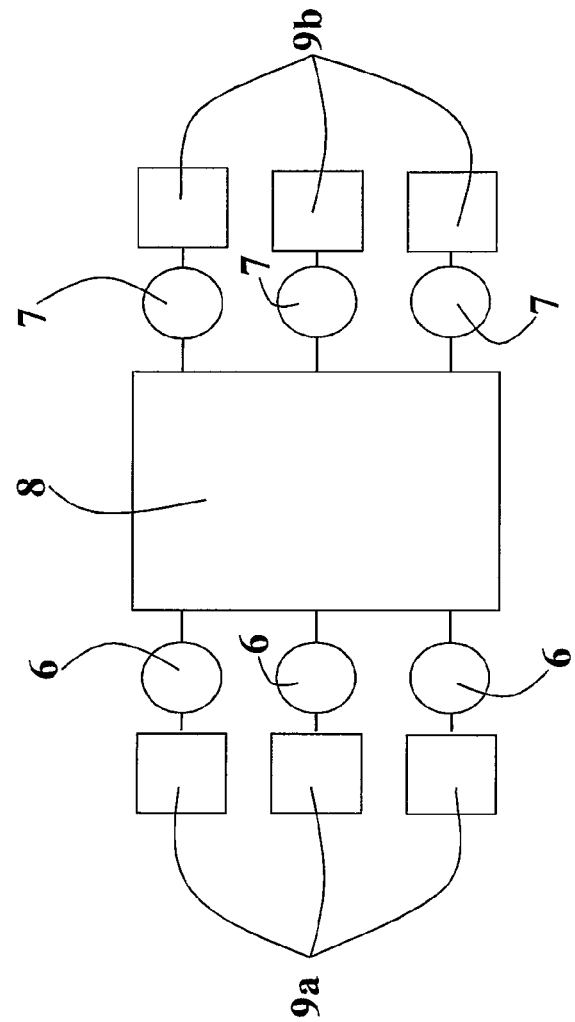
FIG. 3 shows an example of an ONoC architecture.

Modules 6, 7 and 8 may be assembled to design an ON-Chip communication network, like the one illustrated in FIG. 3. In such figure, the IP cores which operate as initiators are indicated in their entirety with reference 9a, while the IP target cores are indicated with reference 9b.

The information outlined above substantially corresponds to what is illustrated in A. Scandurra and I. O'Connor, "Scalable CMOS-compatible photonic routing topologies for versatile networks on chip", presented at the NoCArc congress, in Como, Italy, Nov. 8-9, 2008.

In order to meet the requirements and needs of a variety of different products, the ONoC network may be conceived as a parametric system, i.e. it can have different structures and functionalities depending on the set parameters specified when defining the architecture.

In an embodiment, parameters of the ONoC network are organized in 3 different groups (as listed in Table 1):

high level parameters, which allow specifying the number of IP addresses that have access to the ONoC network, the size of the flit messages and response flit messages within the ONoC network, and whether the ONoC network is programmable or not;

network interface (NI) parameters of the initiator, which allow specifying the interface and the operating mode of the internal microarchitectures of the various IONI interfaces, the size of the FIFO lists and the traffic management; in particular, the dimensions of the FIFO lists are important to guarantee the performance required in the network in terms of assigned bandwidth and guarantee of traffic continuity;

network interface target parameters, which allow specifying the interface and operating mode of the various internal microarchitectures of the various TONI interfaces, sizes of the FIFO lists and traffic management; also in this case the sizes of the FIFO lists are important to guarantee the performances required in the network.

It shall be borne in mind that flits (flow control unit), are the elements transmitted at data link level for example within a clock cycle in case of a synchronous transmission, or as an asynchronous entity.

In terms of interface with the rest of the system, ONoC interfaces of the initiator and target are the same as those of the initiator and target connected thereto, i.e. STBus, AMBA AXI, OCP, and so on and so forth.

TABLE 1

| Parameter name | Description | Range |
| --- | --- | --- |
| init_nb | Number of initiators in the ONoC network | 1 to 32 |
| targ_nb | Number of targets in the ONoC network | 1 to 32 |
| flit_size | Size (in bits) of flit messages | 36, 72 |
| r_flit_size | Size (in bits) of response flit messages | 32, 64 |
| Prog | ONoC programmability | Yes/no |

The following Tables 2, 3 and 4 indicate the signals and timing acquired for each one of them in cases where both the interfaces of the initiator and target are of STNoC type. However, the tables remain valid also in case of different protocols. In particular table 2 shows the signals of the system interface, table 3 shows the signals of the initiator interface, while table 4 shows the signals of the target interface.

The timing provided for all input and output signals are of the "early" type (i.e. within 20% of the clock cycle), in that all inputs come from registered outputs of the NI interfaces arranged near the ONoC transmitters and receivers, and all the outputs are re-timed, implying that all the output signals come from logic electronic devices such as for example flip-flops.

TABLE 2

| Signal name | I/O | Timing | Description |
| --- | --- | --- | --- |
| Clk_onoc | I | N/A | Optical clock network |
| Rst_n_onoc | I | N/A | Optical network reset |
| Clk_prog | I | N/A | Programming clock |
| Rst_n_prog | I | N/A | Programming reset |

TABLE 3

| Signal name | I/O | Timing | Description |
| --- | --- | --- | --- |
| init_req | I | early | Request from STBus initiator to the IONI |
| init_gnt | O | early | Grant from IONI to the STBus initiator |
| init_eop | I | early | End of packet signal |
| init_opc<7:0> | I | early | Opcode signal from the STBus initiator to the IONI |
| init_lck | I | early | Lock signal from the STBus initiator to the IONI |
| init_add<31:X> (where X = 2, 3, 4 when init_data_size = 32, 64, 128 bits, respectively | I | early | Address from the STBus initiator to the IONI |
| init_data<init_data_size-1:0> | I | early | Data from the STBus initiator to the IONI |
| init_be<Y:0> (where Y = 3, 7, 15 when init_data_size = 32, 64, 128 bits, respectively) | I | early | Byte enables signal from the STBus initiator to the IONI |

TABLE 3-continued

| Signal name | I/O | Timing | Description |
|---|---|---|---|
| init_src<9:0> | I | early | Source identification signal from the STBus initiator to the IONI |
| init_tid<7:0> | I | early | Transaction identification signal from the STBus initiator to the IONI |
| init_pri<3:0> | I | early | Priority signal from the STBus initiator to the IONI |
| init_attr<15:0> | I | early | Attribution signal from the STBus initiator to the IONI |
| init_r_req | O | early | Response request from the IONI to the STBus initiator |
| init_r_gnt | I | early | Response grant from the STBus initiator to the IONI |
| init_r_eop | O | early | End of packet response from the IONI to the STBus initiator |
| init_r_opc<7:0> | O | early | Response Opcode signal from the IONI to the STBus initiator |
| init_r_lck | O | early | Response lock signal from the IONI to the STBus initiator |
| init_r_data<init_data_size-1:0> | O | early | Response data signal from the IONI to the STBus initiator |
| init_r_src<9:0> | O | early | Response source identification signal from the IONI to the STBus initiator |
| init_r_tid<7:0> | O | early | Response Transaction identification signal from the IONI to the STBus initiator |

TABLE 4

| Signal name | I/O | Timing | Description |
|---|---|---|---|
| targ_req | O | early | Request from the TONI to the STBus target |
| targ_gnt | I | early | Grant from the STBus target to the TONI |
| targ_eop | O | early | End of packet signal from the TONI to the STBus target |
| targ_opc<7:0> | O | early | Opcode signal from the TONI to the STBus target |
| targ_lck | O | early | Lock signal from the TONI to the STBus target |
| targ_add<31:X> (where X = 2, 3, 4 when targ_data_size = 32, 64, 128 bits, respectively) | O | early | Address from the TONI to the STBus target |
| targ_data<targ_data_size-1:0> | O | early | Data from the TONI to the STBus target |
| targ_be<Y:0> (where Y = 3, 7, 15 when targ_data_size is respectively equivalent to 32, 64, 128 bits) | O | early | Byte enables signal from the TONI to the STBus target |
| targ_src<9:0> | O | early | Source identification signal from the TONI to the STBus target |
| targ_tid<7:0> | O | early | Transaction identification signal from the TONI to the STBus target |
| targ_pri<3:0> | O | early | Priority signal from the TONI to the STBus target |
| targ_attr<15:0> | O | early | Attribution signal from the TONI to the STBus target |
| targ_r_req | I | early | Response request from the STBus target to the TONI |
| targ_r_gnt | O | early | Response grant from the TONI to the STBus target |
| targ_r_eop | I | early | Response end of packet signal from the STBus target to the TONI |
| targ_r_opc<7:0> | I | early | Response Opcode signal from the STBus target to the TONI |

TABLE 4-continued

| Signal name | I/O | Timing | Description |
|---|---|---|---|
| targ_r_lck | I | early | Response lock signal from the STBus target to the TONI |
| targ_r_data<targ_data_size-1:0> | I | early | Response data signal from the STBus target to the TONI |
| targ_r_src<9:0> | I | early | Response source identification signal from the STBus target to the TONI |
| targ_r_tid<7:0> | I | early | Response transaction identification signal from the target STBus to the TONI |

Figure 4:
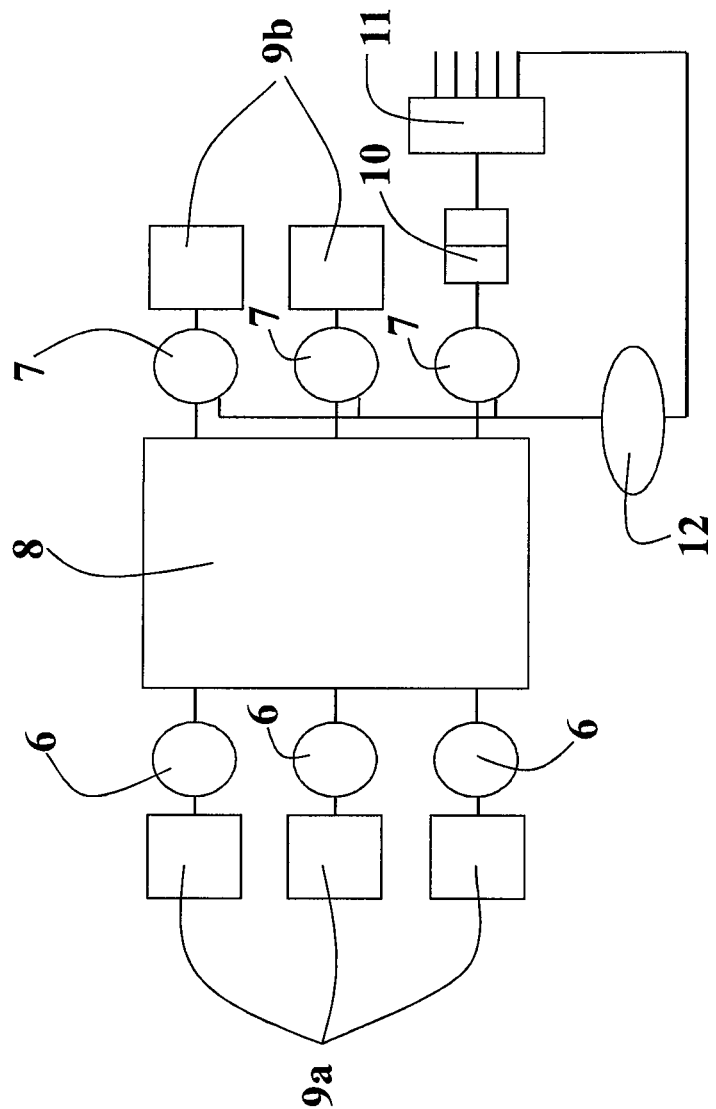
FIG. 4 shows an example of a programmable ONoC architecture.

Referring to FIG. 4, the ONoC network is provided with registers 11 which optionally allow programming at run-time the operation of the network.

The registers 11 are in some NI cores of the ONoC network with the aim of making the arbitration algorithms programmable, in such a manner to guarantee the requested performance depending on the operating context.

In an embodiment, a dedicated programming port may be provided in the NI cores with the aim of accessing registers 11. The port is accessible through an ONoC programming module 12, driven in turn by an interconnection module 10 between the ONoC network and the peripheral subsystem (e.g., through a register decoder in an STBus interconnection) as shown in FIG. 4.

The ONoC programming interface signals, belonging to the ONoC programming module, together with the respective timing, are shown hereinafter in Table 5.

TABLE 5

| Signal name | I/O | Timing | Description |
|---|---|---|---|
| prog_req | I | Early | Request |
| prog_rnw | I | Early | Operating mode identifier (reading/writing) |
| prog_add<7:0> | I | Early | Address |
| prog_data<7:0> | I | Early | Data writing |
| prog_r_req | O | Early | Request response |
| prog_r_err | O | Early | Operating status |
| prog_r_data<7:0> | O | Early | Data reading |

Regarding the physical structure, the circuitry that provides the driver of the emitters and the control of the detectors is obtained in the CMOS chip which contains the entire electronic functionality, while the actual emitter and detector devices are arranged in a separate photonic chip where the optical interconnection is also obtained.

Figure 5:
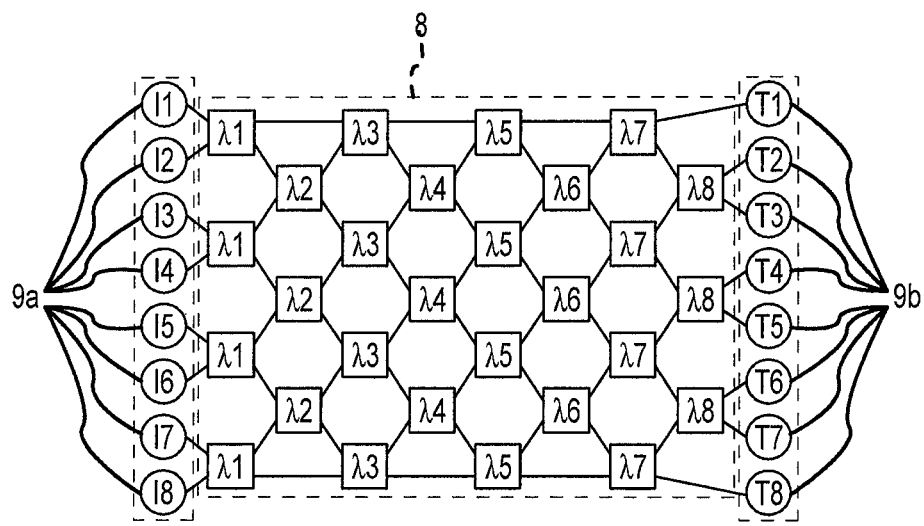
FIG. 5 shows an embodiment of a λ router (LAMBDA router)
Figure 6:
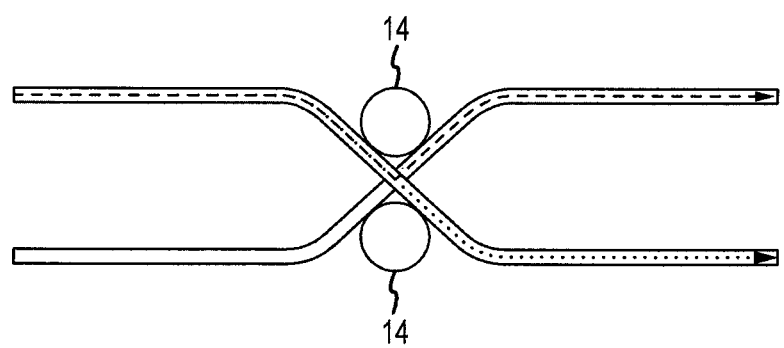
FIG. 6 shows an embodiment detail of the LAMBDA router of FIG. 5.

FIGS. 5 and 6 show the physical structure of a λ router (LAMBDA router), indicated in its entirety with reference 8, responsible for programming light beams according to their wavelength; the example illustrated in FIG. 5 refers to the case of eight initiators 9a and eight targets 9b.

The LAMBDA router is made of a plurality of optical switches λ1, λ2, . . . , λ8, arranged cascading, wherein each switch has two inputs and two outputs. The switches are in turn made using passive resonator microdisks 14, tuned at a specific wavelength λn.

When the wavelength being input into a single switch is equivalent to the characteristic wavelength λn of the optical switch itself, the light beam is output from the switch through the first output port, while if the input wavelength differs from the characteristic λn wavelength of the switch, the light beam is output from the switch through the second port, according to resonance and coupling phenomena. Complex routing structures may be obtained by connecting a plurality of optical switches to each other with two inputs and two outputs.

In an embodiment the LAMBDA router 8 may be of the type described in WO 04/070445, to which reference shall be made for further details.

Data is transmitted from an initiator ad a target simply by selecting a wavelength; as a matter of fact, there is only one physical route associated to a wavelength which puts an initiator in communication with the target.

In this manner, each initiator may simultaneously communicate with one or more targets exploiting various transmission wavelengths.

Figure 7:
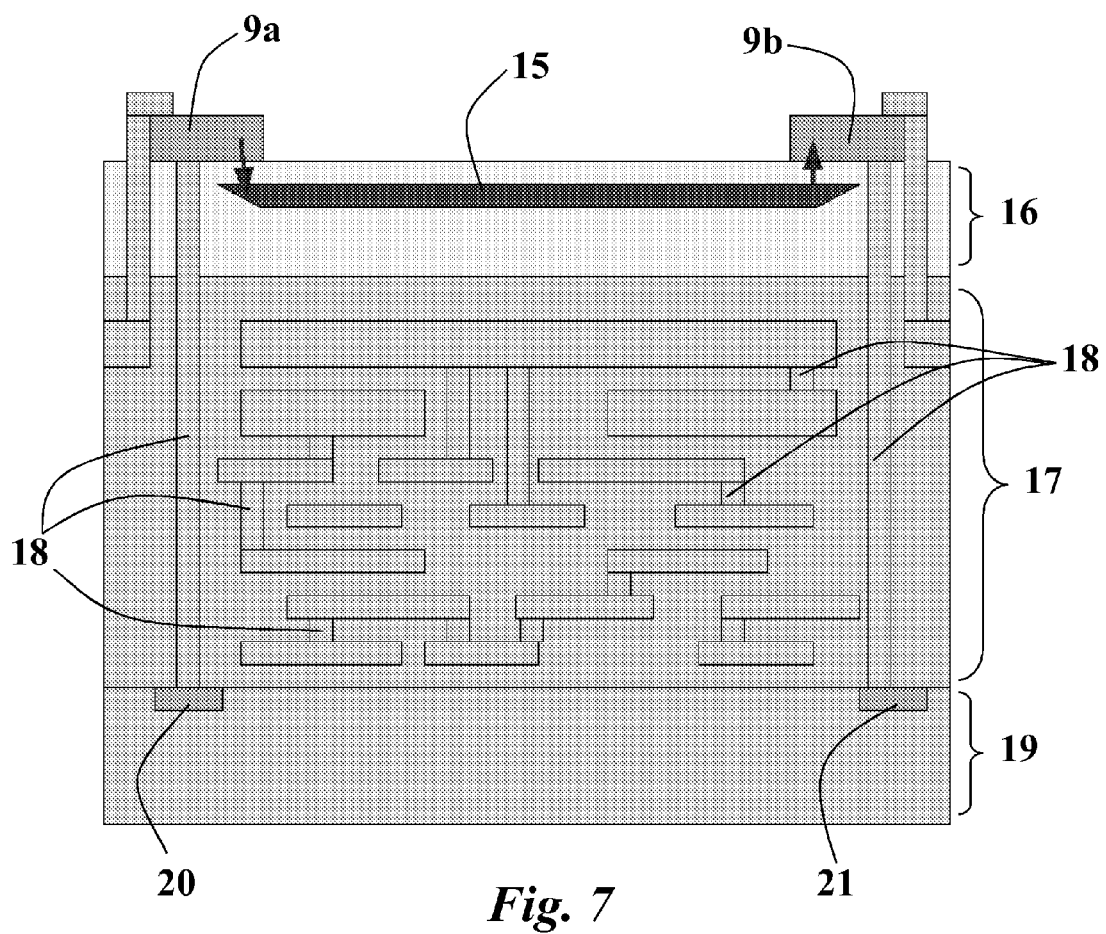
FIG. 7 shows a sectional view with a vertical plane of an embodiment of an ONoC architecture.

The connection between the CMOS circuitry and the photonic level is obtained by means of a series of vias or through connections 18 which transport information in electric form from one level to the other, as shown in FIG. 7. In particular, the initiator 9a and the target 9b are positioned above the photonic level 16 which includes a waveguide 15. The photonic level 16 is connected to a level 17 containing the metal interconnection structures 18. Level 19 contains the CMOS circuitry, and in particular a driver 20 for LASER emitters which serve as transmitters of the initiator 9a and a detector circuit 21 for the receivers of the target 9b.

According to the information outlined above, the positioning of the transmitters 9a and receivers 9b, inside the IP cores in the CMOS chip, takes into account the positioning of the photonic level 16; such photonic level 16 is positioned above the CMOS chip 19 itself, taking into account the fact that the dimensions of the photonic level are usually much smaller than the dimensions of the CMOS chip 19.

This implies that when making the CMOS chip various IP cores 2 are provided having the drivers, transmission lasers, detectors control logic and receivers therein, with the aim of easily installing the vias 18 responsible for the exchange of information between the CMOS chip 19 and the photonic level 16.

Figure 8:
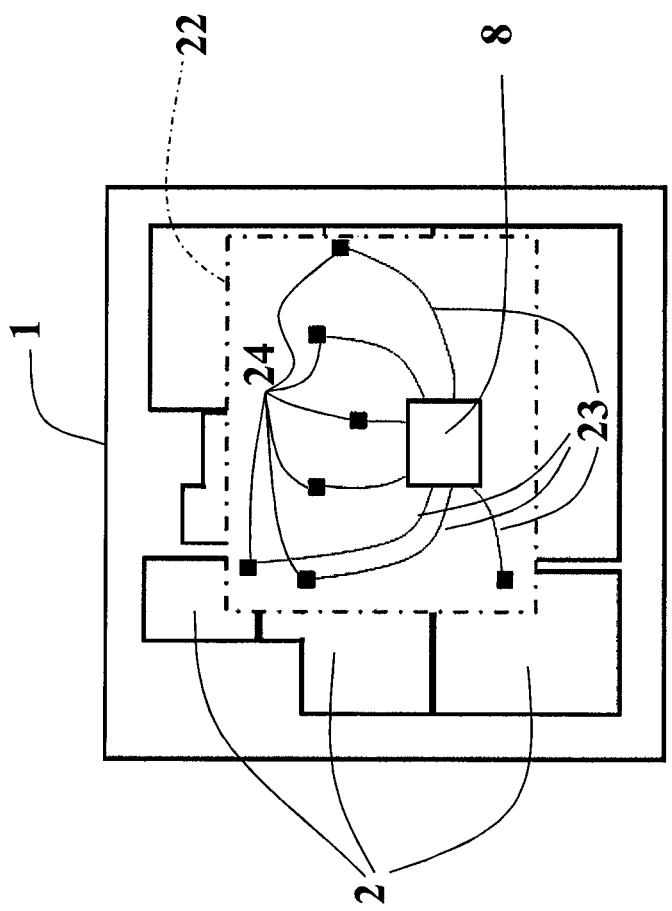
FIG. 8 shows a plan view of a CMOS chip with an ONoC connection network.
Figure 9:
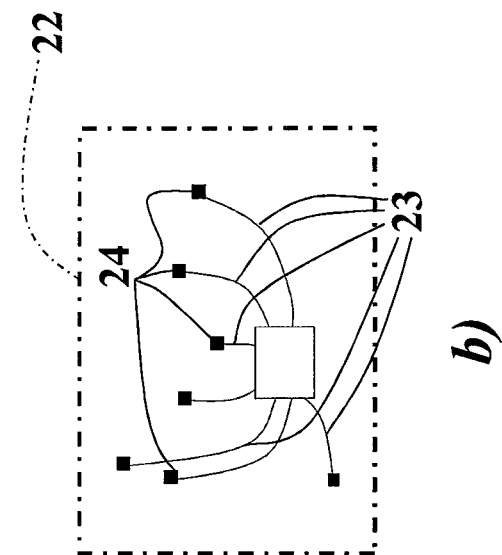
FIGS. 9a and 9b show an exploded view of the chip of FIG. 8.
Figure 9:
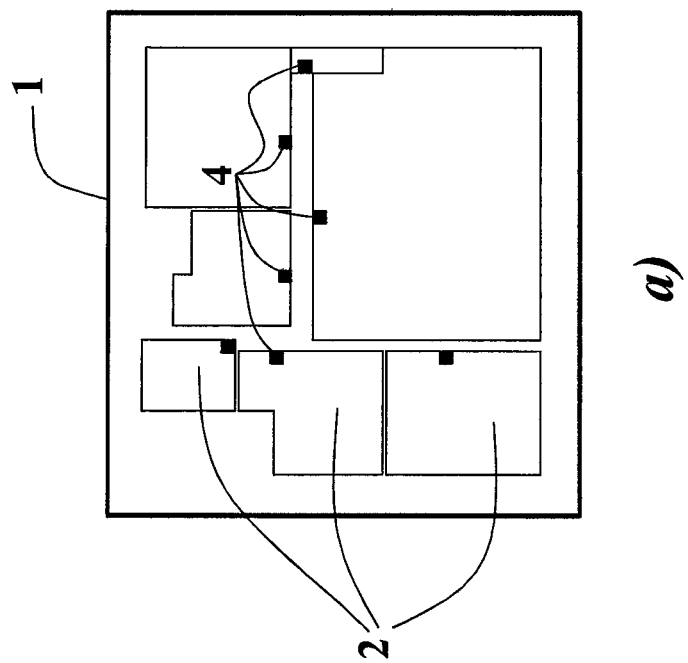

The designing of a CMOS chip which uses the ONoC in place of the electrical interconnections is shown in FIGS. 8 and 9. FIG. 8 shows a plan view with the ONoC interconnection network superimposed to the CMOS chip, while FIGS. 9a and 9b show two separate views, i.e., in the decoupled state, respectively the CMOS chip and the photonic chip with the ONoC interconnection network.

With reference to FIG. 8, superimposed to the CMOS chip 1 which includes the IP cores 2 is a second photonic chip 22 obtained on which are the transmitters and receivers 24 of the ONoC network and the waveguides 23 that connect the transmitters and receivers 24 of the initiators and targets to each other. The second chip 22 is arranged above the first CMOS chip 1 in such a manner that the network interfaces 4 and the transmitters and receivers 24 coincide with respect to each other. Lastly, reference 8 is used to indicate the 2-router used for routing signals.

Respectively represented in the decoupled status in FIGS. 9a and 9b are the two chips 1 and 22 of FIG. 8. As observable, the network interfaces 4 and transmitters and receivers 24 are arranged in such a manner to be aligned with respect to each other when the two chips are superimposed with the aim of allowing communication between the various IP cores.

Two different integration strategies followed in the PICMOS project may be used for the integration of the photonic level of interconnection with the CMOS chip. However, the integration circuit (IC) approach has the advantage of on-line integration capacity, alongside the fact that this approach is similar to the current method of making CMOS, as illustrated in FIG. 10.

Figure 10:
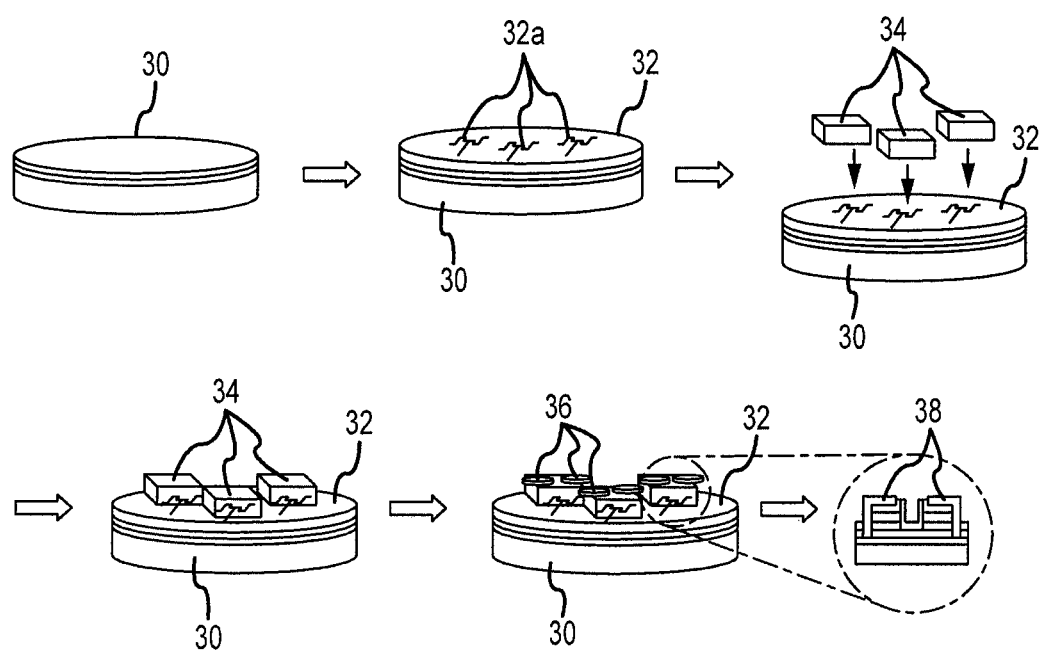
FIG. 10 shows some steps of a method for manufacturing a CMOS chip.

With reference to FIG. 10, deposited on a CMOS wafer 30 is a polymer layer 32 obtained and defined on which are the waveguides 32a. In a subsequent step, structures 34 of the III-V level are arranged and bonding is carried out. The substrate is then removed, and components 36 are defined in the last step. The components 36 are electrically connected to the interconnection photonic level 22 by means of the vias 38.

The proposed ONoC solution has a given number of advantages with respect to the usual NoC electric systems, such as for example the STNoC system, including:
- high bandwidth available, due to the light frequency (THz);
- immunity to noise;
- no interference between light beams;
- eliminating physical issues regarding making CMOS chips, due to a separate chip for photonic interconnections.

The structure of the system includes a CMOS chip which implements the functionalities required by the system and an additional chip intended to implement the communication infrastructure alone. The chips may be identified "mechanically", by simply opening the device container, allowing clear visibility of the various chips stacked over each other, with the possibility of observing that one is an electronic CMOS chip and the other is a chip containing optoelectronic structures (emitters, detectors, waveguides).

Without prejudice to the principle of the invention, the details and embodiments may vary, even significantly, with respect to what has been described herein by way of non-limiting example only, without departing from the scope of the invention as defined by the annexed claims.

The invention claimed is:

1. A system for exchanging information in an on-chip communication network using optical flow information for communication between Intellectual Property cores, comprising:
a plurality of initiators and targets included in said Intellectual Property cores, and a router for propagating optical flow information from the initiators to the targets;
each initiator comprising an interface to convert the traffic generated by the initiator and transmit it in the form of an optical flow within the on-chip communication network; and
each target comprising an interface to convert information from the optical form into the electrical form;
a first set of parameters associated with high level functions of the on-chip communication network, which allow specifying the number of the network IP access addresses and the size of the flit messages;
a second set of parameters associated with the initiators;
a third set of parameters associated with the targets; and
a programming module to define said first, second, and third set of parameters.

2. The system of claim 1, wherein said initiator interface comprises one or more optoelectronic transmitters to convert information from the electric form to the optical form.

3. The system of claim 2, wherein said initiator interface comprises a plurality of emitters and said optoelectronic transmitters are configured to select the emitter to be used according to the wavelength to be transmitted.

4. The system of claim 3, wherein said optoelectronic transmitters are configured to drive and control the selected emitter.

5. The system of claim 2, wherein said optoelectronic transmitters convert information through serialization of information.

6. The system of claim 5, wherein said optoelectronic transmitters are configured to drive and control the selected emitter.

7. The system of claim 1, wherein said target interface comprises one or more optoelectronic receivers to convert information from the optical form to the electric form through de-serialization of information.

8. The system of claim 7, wherein said target interface comprises a plurality of detectors and said optoelectronic receivers are configured to convert the photo current received by said detectors into an electric signal.

9. The system of claim 8, wherein said receivers are configured to decode the information and to adjust the level.

10. The system of claim 1, wherein said router comprises a $\lambda$ router.

11. The system of claim 1, further comprising a first chip implementing electronic functions thereof and a second chip implementing optical interconnections.

12. The system of claim 1, wherein at least one said Intellectual Property core comprises registers to program run-time operation of the on-chip communication network, whereby arbitration algorithms are made programmable.

13. The system of claim 12, wherein said programming module is driven by an interconnection module between the network and a peripheral subsystem.

14. The system of claim 13, wherein said interconnection module comprises a register decoder.

15. A system for exchanging information in an on-chip communication network using optical flow information for communication between Intellectual Property cores, comprising:
a plurality of initiators and targets included in said Intellectual Property cores, and a router for propagating optical flow information from the initiators to the targets;
each initiator comprising an interface to convert the traffic generated by the initiator and transmit it in the form of an optical flow within the on-chip communication network; and
each target comprising an interface to convert information from the optical form into the electrical form;
a first set of parameters associated with high level functions of the on-chip communication network;
a second set of parameters associated with the initiators, which allow specifying the interface and its operation mode and the size of FIFO lists;
a third set of parameters associated with the targets; and a programming module to define said first, second, and third set of parameters.

16. The system of claim 15, wherein said initiator interface comprises one or more optoelectronic transmitters to convert information from the electric form to the optical form.

17. The system of claim 16, wherein said initiator interface comprises a plurality of emitters and said optoelectronic transmitters are configured to select the emitter to be used according to the wavelength to be transmitted.

18. The system of claim 17, wherein said optoelectronic transmitters are configured to drive and control the selected emitter.

19. The system of claim 16, wherein said optoelectronic transmitters convert information through serialization of information.

20. The system of claim 19, wherein said optoelectronic transmitters are configured to drive and control the selected emitter.

21. The system of claim 15, wherein said target interface comprises one or more optoelectronic receivers to convert information from the optical form to the electric form through de-serialization of information.

22. The system of claim 21, wherein said target interface comprises a plurality of detectors and said optoelectronic receivers are configured to convert the photo current received by said detectors into an electric signal.

23. The system of claim 22, wherein said receivers are configured to decode the information and to adjust the level.

24. The system of claim 15, wherein said router comprises a λ router.

25. The system of claim 15, further comprising a first chip implementing electronic functions thereof and a second chip implementing optical interconnections.

26. The system of claim 15, wherein at least one said Intellectual Property core comprises registers to program run-time operation of the on-chip communication network, whereby arbitration algorithms are made programmable.

27. The system of claim 26, wherein said programming module is driven by an interconnection module between the network and a peripheral subsystem.

28. The system of claim 27, wherein said interconnection module comprises a register decoder.

29. A system for exchanging information in an on-chip communication network using optical flow information for communication between Intellectual Property cores, comprising:
   a plurality of initiators and targets included in said Intellectual Property cores, and a router for propagating optical flow information from the initiators to the targets;
   each initiator comprising an interface to convert the traffic generated by the initiator and transmit it in the form of an optical flow within the on-chip communication network; and
   each target comprising an interface to convert information from the optical form into the electrical form;
   a first set of parameters associated with high level functions of the on-chip communication network;
   a second set of parameters associated with the initiators;
   a third set of parameters associated with the targets, which allow specifying the interface and its operation mode and the size of FIFO lists; and
   a programming module to define said first, second, and third set of parameters.

30. The system of claim 29, wherein said initiator interface comprises one or more optoelectronic transmitters to convert information from the electric form to the optical form.

31. The system of claim 30, wherein said initiator interface comprises a plurality of emitters and said optoelectronic transmitters are configured to select the emitter to be used according to the wavelength to be transmitted.

32. The system of claim 31, wherein said optoelectronic transmitters are configured to drive and control the selected emitter.

33. The system of claim 30, wherein said optoelectronic transmitters convert information through serialization of information.

34. The system of claim 33, wherein said optoelectronic transmitters are configured to drive and control the selected emitter.

35. The system of claim 29, wherein said target interface comprises one or more optoelectronic receivers to convert information from the optical form to the electric form through de-serialization of information.

36. The system of claim 35, wherein said target interface comprises a plurality of detectors and said optoelectronic receivers are configured to convert the photo current received by said detectors into an electric signal.

37. The system of claim 36, wherein said receivers are configured to decode the information and to adjust the level.

38. The system of claim 29, wherein said router comprises a λ router.

39. The system of claim 29, further comprising a first chip implementing electronic functions thereof and a second chip in implementing optical interconnections.

40. The system of claim 29, wherein at least one said Intellectual Property core comprises registers to program run-time operation of the on-chip communication network, whereby arbitration algorithms are made programmable.

41. The system of claim 40, wherein said programming module is driven by an interconnection module between the network and a peripheral subsystem.

42. The system of claim 41, wherein said interconnection module comprises a register decoder.

* * * * *